(12) United States Patent
Nishikawa et al.

(10) Patent No.: US 7,975,049 B2
(45) Date of Patent: Jul. 5, 2011

(54) POINT-BASED CUSTOMER TRACKING AND MAINTENANCE INCENTIVE SYSTEM

(75) Inventors: Hiroshi Nishikawa, Minato-ku (JP); Youichi Araki, Nirasaki (JP); Kiichi Hama, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 12/708,193

(22) Filed: Feb. 18, 2010

(65) Prior Publication Data

US 2010/0145781 A1 Jun. 10, 2010

Related U.S. Application Data

(60) Division of application No. 10/929,949, filed on Aug. 31, 2004, now Pat. No. 7,698,149, which is a continuation of application No. PCT/JP03/03285, filed on Mar. 18, 2003.

(30) Foreign Application Priority Data

Mar. 19, 2002 (JP) ................................ 2002-076048

(51) Int. Cl.
*G06F 15/173* (2006.01)
(52) U.S. Cl. ..................................... 709/224; 705/14.11
(58) Field of Classification Search .................. 709/224; 705/14.11
See application file for complete search history.

(56) References Cited

U.S. PATENT DOCUMENTS

| | | | |
|---|---|---|---|
| 5,237,507 A | 8/1993 | Chasek | |
| 5,542,047 A | 7/1996 | Armstrong | |
| 5,761,647 A | 6/1998 | Boushy | |
| 5,862,338 A | 1/1999 | Walker et al. | |
| 5,923,850 A | 7/1999 | Barroux | |
| 5,930,773 A | 7/1999 | Crooks et al. | |
| 6,006,251 A | 12/1999 | Toyouchi et al. | |
| 6,061,660 A | 5/2000 | Eggleston et al. | |
| 6,385,497 B1 | 5/2002 | Ogushi et al. | |
| 6,658,586 B1 | 12/2003 | Levi | |
| 6,901,374 B1 | 5/2005 | Himes | |

(Continued)

FOREIGN PATENT DOCUMENTS

JP 2001-338854 12/2001

(Continued)

OTHER PUBLICATIONS

Symons, Craig; "Market Overview: Enterprise Incentive Management"; Giga Information Group, Inc.; Sep. 3, 2002.

(Continued)

*Primary Examiner* — Kevin Bates
*Assistant Examiner* — Jeffrey Nickerson
(74) *Attorney, Agent, or Firm* — Oblon, Spivak, McClelland, Maier & Neustadt, L.L.P.

(57) ABSTRACT

A computer terminal connected to a manufacturing apparatus as an object of the maintenance management is connected to a server machine providing a maintenance management service by a network, enabling bi-directional communication. The computer terminal transmits maintenance information including a kind of a maintenance method executed at the customer side to the server machine. The server machine acquires the kind of the maintenance method from the maintenance information received from the computer terminal, retrieves points corresponding to the kind of the maintenance method, and stores the retrieved points in a maintenance point storage unit. More points are set for more time consuming maintenance. This can encourage the customer to perform more time consuming maintenance on the manufacturing apparatus in order to obtain more points.

12 Claims, 19 Drawing Sheets

216b

| CUSTOMER NAME | ID | APPARATUS IN POSSESSION (SERIAL NUMBER) | STATUS INFORMATION | STATUS POINTS | ON-CALL INFORMATION | REMARKS |
|---|---|---|---|---|---|---|
| A COMPANY (OO FACTORY) | XXX | A01 | IN ORDER (OK) | 12000 | NO | |
| | | A02 | OUT OF ORDER (NG) | 5000 | YES | |
| | | A03 | IN ORDER (OK) | 1500 | NO | |
| | | A04 | IDLE STATUS | 30200 | NO | |

U.S. PATENT DOCUMENTS

| | | |
|---|---|---|
| 7,003,564 B2 | 2/2006 | Greuel et al. |
| 7,065,570 B2 | 6/2006 | Fukushima et al. |
| 7,124,109 B2 | 10/2006 | Sakamoto et al. |
| 7,133,807 B2 | 11/2006 | Karasawa |
| 2002/0052813 A1* | 5/2002 | Kinugawa et al. ............... 705/34 |
| 2002/0059412 A1 | 5/2002 | Azpitarte |
| 2002/0069188 A1 | 6/2002 | Anvekar et al. |
| 2002/0116266 A1* | 8/2002 | Marshall .......................... 705/14 |
| 2002/0128728 A1 | 9/2002 | Murakami et al. |
| 2002/0142841 A1 | 10/2002 | Boushy |
| 2003/0027631 A1 | 2/2003 | Hedrick et al. |
| 2003/0046166 A1* | 3/2003 | Liebman .......................... 705/15 |
| 2003/0105664 A1 | 6/2003 | Van Luchene |
| 2004/0215577 A1 | 10/2004 | Mitsuda |

FOREIGN PATENT DOCUMENTS

JP  2002-74135  3/2002

OTHER PUBLICATIONS

SGI.com; "Map function definition"; SGI.com; Feb. 21, 2001; pp. 1-6.

eAssist; "eAssist global solutions: Where dialtone and webtone converge."; Feb. 25, 2002; San Diego Business Journal; vol. 23, No. 8, printed pp. 1-4.

Office Action issued in U.S. Appl. No. 12/708,145 dated Oct. 6, 2010.

* cited by examiner

| RANDOM NUMBER | LOTTERY POINTS | WINNER / LOSER |
|---|---|---|
| 0 | 0 | LOSER |
| 1 | 0 | LOSER |
| 2 | 200 | WINNER |
| 3 | 0 | LOSER |
| 4 | 0 | LOSER |
| 5 | 500 | WINNER |
| 6 | 0 | LOSER |
| 7 | 0 | LOSER |
| 8 | 800 | WINNER |
| 9 | 0 | LOSER |

| CUSTOMER NAME | ID | PASSWORD | ADDRESS | APPARATUS IN POSSESSION (SERIAL NUMBER) |
|---|---|---|---|---|
| A COMPANY (OO FACTORY) | XXX | XXXX | OO CITY, OO STATE | A01, A02, A03, A04 |
| B COMPANY (OO FACTORY) | XXX | XXXX | OO CITY, OO STATE | B01, B02 |
| C COMPANY (OO FACTORY) | XXX | XXXX | OO CITY, OO STATE | C01, C02, C03 |
| | | | | |

FIG. 7

| CUSTOMER NAME | ID | APPARATUS IN POSSESSION (SERIAL NUMBER) | STATUS INFORMATION | STATUS POINTS | ON-CALL INFORMATION | REMARKS |
|---|---|---|---|---|---|---|
| A COMPANY (OO FACTORY) | XXX | A01 | IN ORDER (OK) | 12000 | NO | |
| | | A02 | OUT OF ORDER (NG) | 5000 | YES | |
| | | A03 | IN ORDER (OK) | 1500 | NO | |
| | | A04 | IDLE STATUS | 30200 | NO | |

STATUS POINT INFORMATION

A COMPANY

| MANUFACTURING APPARATUS (SERIAL NUMBER) | | STATUS | STATUS POINTS | ON-CALL | REMARKS |
|---|---|---|---|---|---|
| A01 | ●○○ | IN ORDER (OK) | 12000 | NO | |
| A02 | ○○● | OUT OF ORDER (NG) | 5000 | YES | OO ERROR |
| A03 | ●○○ | IN ORDER (OK) | 15000 | NO | |
| A04 | ○●○ | IDLE STATUS | 30200 | NO | |

| CUSTOMER NAME | ID | MAINTENANCED APPARATUS (SERIAL NUMBER) | KIND OF MAINTENANCE METHOD | MAINTENANCE POINTS | MAINTENANCE DAY |
|---|---|---|---|---|---|
| A COMPANY (○○ FACTORY) | XXX | A01 | METHOD OF EXCHANGING UPPER ELECTRODES IN CHAMBER | 100 | MONTH/DAY/YEAR |

| CUSTOMER NAME | ID | RESTARTED APPARATUS (SERIAL NUMBER) | LOTTERY POINTS | RESTART DAY |
|---|---|---|---|---|
| A COMPANY (OO FACTORY) | XXX | A01 | 0 | MONTH/DAY/YEAR |
| | XXX | A02 | 100 | MONTH/DAY/YEAR |
| | | | | |

| CUSTOMER NAME | ID | CUMULATIVE POINTS | | | |
|---|---|---|---|---|---|
| | | STATUS POINTS | MAINTENANCE POINTS | LOTTERY POINTS | SUM |
| A COMPANY (OO FACTORY) | XXX | 45000 | 5000 | 100 | 50100 |
| B COMPANY (OO FACTORY) | XXX | 35000 | 0 | 0 | 35000 |
| C COMPANY (OO FACTORY) | XXX | 15000 | 0 | 0 | 15000 |

| KIND OF MAINTENANCE METHOD | | | TIME REQUIRED FOR MAINTENANCE | MAINTENANCE POINTS | DESCRIPTION OF MAINTENANCE METHOD |
|---|---|---|---|---|---|
| CHAMBER | UPPER ELECTRODE | EXCHANGING METHOD | XX | XXXX | ------ |
| | | CLEANING METHOD | XX | XXXX | ------ |
| | | EXAMINING METHOD WITH NAKED EYE | XX | XXXX | ------ |
| | LOWER ELECTRODE | EXCHANGING METHOD | XX | XXXX | ------ |
| | | CLEANING METHOD | XX | XXXX | ------ |
| | | EXAMINING METHOD WITH NAKED EYE | XX | XXXX | ------ |
| | EXHAUST BAFFLE PLATE | | XX | XXXX | ------ |
| | CHAMBER WALL | | XX | XXXX | ------ |
| TRANSFER SYSTEM | | ADJUSTING METHOD | XX | XXXX | ------ |
| | | CLEANING METHOD | XX | XXXX | ------ |

FIG.15

CONTENTS MENU

○ DESCRIPTION OF SEMICONDUCTOR MANUFACTURING APPARATUS

○ DESCRIPTION OF SERVICE PROVIDED

⦿ DESCRIPTION OF MAINTENANCE METHOD

○
○
○
○
○
○

SELECT ONE AND PRESS ENTER

ENTER

FIG. 17

DESCRIPTION OF MAINTENANCE METHOD

○ INSIDE CHAMBER - UPPER ELECTRODE - EXCHANGING METHOD (1) FIRST, •••••

(2) NEXT, •••••

(3) THEN, •••••

○ MAINTENANCE POINTS

XXXXX POINTS

○ MAINTENANCED APPARATUS   A01
  (SERIAL NUMBER)

※ WHEN MAINTENACE IS COMPLETED, INPUT APPARATUS
  NAME BY ITS SERIAL NUMBER AND PRESS END BUTTON

END

POINT-BASED CUSTOMER TRACKING AND MAINTENANCE INCENTIVE SYSTEM

This application is a divisional of pending U.S. application Ser. No. 10/929,949 filed on Aug. 31, 2004, which is a Continuation Application of PCT International Application No. PCT/JP03/03285 filed on Mar. 18, 2003, which designated the United States, which claims priority to Japanese Patent Application No. 2002-076048 filed on Mar. 19, 2002.

FIELD OF THE INVENTION

The present invention relates to a system, a server, a computer terminal, a program and a recording medium for providing maintenance management point service of a semiconductor manufacturing apparatus and the like, and a processing method therefor.

BACKGROUND OF THE INVENTION

Conventionally, when a semiconductor manufacturing apparatus and the like belonging to a customer require maintenance management, the customer contacts a nearest service station by fax or phone, and a serviceman such as a service engineer working for the service station is dispatched to the customer to perform maintenance on the semiconductor manufacturing apparatus and the like in response to the request made by the customer (on-call service).

However, there are times when the customer can perform simple maintenance task on the semiconductor manufacturing apparatus by him/herself, or even perform complex maintenance task by him/herself, given a proper maintenance instructions.

But, conventionally, since the serviceman visits the customer after receiving the on-call regardless of maintenance that can be performed by the customer, the serviceman is under a high volume of workload.

SUMMARY OF THE INVENTION

The present invention has been conceived from the above drawbacks; and it is, therefore, an object of the present invention to provide a maintenance management point service system capable of promoting customer's own repair (maintenance) as much as possible and reducing workload of servicemen.

In accordance with one aspect of the present invention in order to overcome the above drawbacks, there is provided a maintenance management point service system, including a computer terminal of a customer side, connected to an object apparatus serving as an object of maintenance management; and a server machine, for providing maintenance management service, connected with the computer terminal through a network for a bi-directional communication, wherein the computer terminal collects status information from the object apparatus serving as the object of maintenance management, the status information at least including information regarding whether or not the object apparatus is powered on, and transmits the collected status information via the network in response to a request of the server machine, and the server machine includes a status point storage unit for storing points generated based on the status information; receives the status information from the computer terminal at every specific interval; determines whether or not the object apparatus serving as the object of maintenance management is powered on based on the status information; renews points of the status point storage unit by adding specific number of points in case of determining that the object apparatus is powered on; and does not renew the points of the status point storage unit in case of determining that the object apparatus is not powered on.

By such configuration, when an apparatus serving as an object of maintenance management (e.g., a semiconductor manufacturing apparatus) is powered on, for example, when the manufacturing apparatus and the like make a certain response (an acknowledge) to an inquiry (a request) from a computer terminal, points are added at every specified interval. Consequently, for example, when the manufacturing apparatus is powered on continuously, benefit points are accumulated and thus the customer tries to perform maintenance by him/herself to collect points, which in turn promotes the customer's own maintenance and reduces workload of servicemen.

Further, the server machine may include a maintenance request storage unit for storing information regarding whether or not a customer request for maintenance and may not renew the points of the status point storage unit in case of determining that there was a request for maintenance based on the information stored in the maintenance request storage unit. By such configuration, when there is a request for maintenance, i.e., a maintenance request (on-call) from a customer via a telephone, FAX, a network such as the internet connected to a computer terminal and the like, e.g., in case that the manufacturing apparatus of the customer is in malfunction, the points are not added. Consequently, the customer performs maintenance by him/herself without on-call as much as possible to collect points, whereby the customer can be encouraged to perform maintenance by him/herself and thus workload of servicemen can be reduced.

Furthermore, the status information may include information regarding whether or not the object apparatus serving as the object of maintenance management is in a state of malfunction, and the server machine may not renew the points of the status point storage unit in case of determining that the object apparatus serving as the object of the maintenance management is in the state of malfunction based on the status information received from the computer terminal. By such configuration, when the manufacturing apparatus of the customer is in a state of malfunction, e.g., occurrence of trouble, points are not added. Consequently, the customer tries to maintain a normal operation as much as possible to collect points, which in turn promotes the customer's own maintenance and reduces workload of servicemen.

In accordance with another aspect of the present invention in order to overcome the above drawbacks, there is provided a maintenance management point service system, including a computer terminal of a customer side, connected to an object apparatus serving as an object of maintenance management; and a server machine, for providing maintenance management service, connected with the computer terminal through a network for bi-directional communication, wherein the computer terminal transmits maintenance information including a kind of a maintenance method executed at the customer side to the server machine, and the server machine includes a maintenance point storage unit for storing points generated based on the maintenance information and a maintenance point setting storage unit for storing points set according to kinds of maintenance methods; acquires the kind of the maintenance method from the maintenance information received from the computer terminal; retrieves points corresponding to the kind of the maintenance method based on the maintenance point setting storage unit; and stores the retrieved points in the maintenance point storage unit. Such configuration generates points according to kinds of maintenance performed by the customer him/herself. Consequently, the customer tries to perform maintenance by him/herself to collect points, which in turn promotes the customer's own maintenance and reduces workload of servicemen.

Further, as the maintenance point storage unit sets more points for more time consuming maintenance, the customer tries to perform difficult maintenance taking longer amount time to collect higher points, whereby the customer's own maintenance can be promoted despite difficult maintenance and thus workload of servicemen can be further reduced.

In accordance with still another aspect of the present invention in order to overcome the above drawbacks, there is provided a maintenance management point service system, including a computer terminal of a customer side, connected to an object apparatus serving as an object of maintenance management; and a server machine, for providing maintenance management service, connected with the computer terminal through a network for bi-directional communication, wherein the computer terminal monitors whether or not the object apparatus serving as the object of maintenance management is restarted and transmits restart information including information indicating restart completion to the server machine in case of determining that the object apparatus serving as the object of maintenance management is restarted, and the server machine includes a lottery point storage unit for storing points generated based on a result of a lottery executed in response to the restart information and a lottery point setting storage unit for storing preset points corresponding to numbers within a specific range employed in the lottery; generates a random number within the specific range upon reception of the restart information from the computer terminal; retrieves points corresponding to the random number from the lottery point setting storage unit; and stores the retrieved points in the lottery point storage unit.

By such configuration, zero point for a lottery loser and predetermined points for lottery winners are set in a lottery point setting storage unit, and when the manufacturing apparatus is restarted after the customer performs maintenance thereof, a lottery is such that when picking a winner predetermined number of points are gained. Consequently, the customer tries to win the lottery to collect points, which in turn promotes the customer's own maintenance and reduces workload of servicemen.

In accordance with still another aspect of the present invention in order to overcome the above drawbacks, there is provided a server machine, for providing maintenance management service, connected with a computer terminal of a customer side through a network for bi-directional communication, the computer terminal being connected to an object apparatus serving as an object of maintenance management, the server machine including a status point storage unit for storing points generated based on status information, which at least includes information collected by the computer terminal from the object apparatus serving as the object of maintenance management and indicates whether or not the object apparatus is powered on, wherein the server machine receives the status information through the network from the computer terminal at every specified interval; determines whether or not the object apparatus serving as the object of maintenance management is powered on based on the status information; renews points of the status point storage unit by adding specific number of points in a case of determining that the object apparatus is powered on; and does not renew the points of the status point storage unit in a case of determining that the object apparatus is not powered on. By such configuration, for example, when the manufacturing apparatus is powered on continuously, benefit points are accumulated and thus the customer tries to perform maintenance by him/herself to collect points, which in turn promotes the customer's own maintenance and reduces workload of servicemen.

The server machine further includes a maintenance request storage unit for storing information regarding whether or not a customer requests for maintenance, wherein the server machine may not renew points of the status point storage unit in case of determining that there was a request for maintenance based on the information stored in the maintenance request storage unit. Furthermore, the status information further includes information regarding whether or not the object apparatus serving as the object of maintenance management is in a state of malfunction, and the server machine may not renew the points of the status point storage unit in case of determining that the object apparatus serving as the object of the maintenance management is in the state of malfunction based on the status information received from the computer terminal. Consequently, the customer performs maintenance by him/herself without on-call as much as possible to collect points, whereby the customer can be encouraged to perform maintenance by him/herself and thus workload of servicemen can be reduced.

In accordance with still another aspect of the present invention in order to overcome the above drawbacks, there is provided a server machine, for providing maintenance management service, connected with a computer terminal of a customer side through a network for bi-directional communication, the computer terminal being connected to an object apparatus serving as an object of maintenance management, the server machine including a maintenance point storage unit for storing points generated based on maintenance information including a kind of a maintenance method executed at the customer side; and a maintenance point setting storage unit for storing points set according to kinds of maintenance methods, wherein the server machine acquires the kind of the maintenance method from the maintenance information received from the computer terminal; retrieves points corresponding to the kind of the maintenance method based on the maintenance point setting storage unit; and stores the retrieved points in the maintenance point storage unit. Consequently, the customer tries to perform maintenance by him/herself as much as possible to collect higher points, which in turn promotes the customer's own maintenance and reduces workload of servicemen.

The maintenance point storage unit may set more points for more time consuming maintenance. Consequently, the customer tries to perform difficult maintenance taking longer amount time to collect higher points, whereby the customer's own maintenance can be promoted despite difficult maintenance and thus workload of servicemen can be further reduced.

In accordance with still another aspect of the present invention in order to overcome the above drawbacks, there is provided a server machine, for providing maintenance management service, connected with a computer terminal of a customer side through a network for bi-directional communication, the computer terminal being connected to an object apparatus serving as an object of maintenance management, the server machine including a lottery point storage unit for storing points generated based on a result of a lottery executed upon receiving from the computer terminal restart information including information indicating that the object apparatus serving as an object of maintenance management was restarted; and a maintenance point setting storage unit for storing preset points corresponding to numbers within a specific range employed in the lottery, wherein the server machine generates a random number within the specific range upon reception of the restart information from the computer terminal; retrieves points corresponding to the random number from the lottery point setting storage unit; and stores the retrieved points in the lottery point storage unit. Consequently, the customer tries to win the lottery to collect points, which in turn promotes the customer's own maintenance and reduces workload of servicemen.

In accordance with still another aspect of the present invention in order to overcome the above drawbacks, there is provided a program for providing maintenance management point service to a customer, wherein the program runs on a computer and works with a server machine, wherein the server machine is connected with a computer terminal of a customer side through a network for bi-directional communication, the computer terminal being connected to an object apparatus serving as an object of maintenance management, and includes a status point storage unit for storing points generated based on status information, which at least includes information collected by the computer terminal from the object apparatus serving as the object of maintenance management and indicates whether or not the object apparatus is powered on, and wherein the program allows the server machine to receive the status information from the computer terminal through the network at every specific interval; to determine whether or not the object apparatus serving as the object of maintenance management is powered on based on the status information; to renew points of the status point storage unit by adding specific number of points in case of determining that the object apparatus is powered on; and not to renew the points of the status point storage unit in case of determining that the object apparatus is not powered on. Such configuration enables a computer to function as the server in order to accumulate benefit points, e.g., when the manufacturing apparatus is powered on continuously.

In accordance with still another aspect of the present invention in order to overcome the above drawbacks, there is provided a program for providing maintenance management point service to a customer, wherein the program runs on a computer and works with a server machine, wherein the a server machine is connected with a computer terminal of a customer side through a network for bi-directional communication, the computer terminal being connected to an object apparatus serving as an object of maintenance management, and includes a maintenance point storage unit for storing points generated based on the maintenance information including a kind of a maintenance method executed at the customer side and a maintenance point setting storage unit for storing points set according to kinds of maintenance methods, and wherein the program allows the server machine to acquire the kind of the maintenance method from the maintenance information received from the computer terminal; to retrieve points corresponding to the kind of the maintenance method based on the maintenance point setting storage unit; and to store the retrieved points in the maintenance point storage unit. Such configuration enables a computer to function as the server in order to generate points according to the kind of maintenance.

In accordance with still another aspect of the present invention in order to overcome the above drawbacks, there is provided a program for providing maintenance management point service to a customer, wherein the program runs on a computer and works with a server machine, wherein the server machine is connected with a computer terminal of a customer side through a network for bi-directional communication, the computer terminal being connected to an object apparatus serving as an object of maintenance management, and includes a lottery point storage unit for storing points generated based on a result of a lottery executed in response to the restart information and a lottery point setting storage unit for storing preset points corresponding to numbers within a specific range employed in the lottery, and wherein the program allows the server machine to generate a random number within the specific range upon reception of the restart information from the computer terminal; to retrieve points corresponding to the random number from the lottery point setting storage unit; and to store the retrieved points in the lottery point storage unit. Such configuration enables a computer to generate points according to a result of a lottery performed upon restarting the manufacturing apparatus.

In accordance with still another aspect of the present invention in order to overcome the above drawbacks, there is provided a computer-readable recording medium storing a program for providing maintenance management point service to a customer, wherein the program runs on a computer and works with a server machine, wherein the server machine is connected with a computer terminal of a customer side through a network for bi-directional communication, the computer terminal being connected to an object apparatus serving as an object of maintenance management, and includes a status point storage unit for storing points generated based on status information, which at least includes information collected by the computer terminal from the object apparatus serving as the object of maintenance management and indicates whether or not the object apparatus is powered on, and wherein the program allows the server machine to receive the status information from the computer terminal through the network at every specific interval; to determine whether or not the object apparatus serving as the object of maintenance management is powered on based on the status information; to renew points of the status point storage unit by adding specific number of points in case of determining that the object apparatus is powered on; and not to renew the points of the status point storage unit in case of determining that the object apparatus is not powered on. Such configuration enables a computer to function as the server in order to accumulate benefit points, e.g., when the manufacturing apparatus is powered on continuously.

In accordance with still another aspect of the present invention in order to overcome the above drawbacks, there is provided a computer-readable recording medium storing a program for providing maintenance management point service to a customer, wherein the program runs on a computer and works with a server machine, wherein the a server machine is connected with a computer terminal of a customer side through a network for bi-directional communication, the computer terminal being connected to an object apparatus serving as an object of maintenance management, and includes a maintenance point storage unit for storing points generated based on the maintenance information including a kind of a maintenance method executed at the customer side and a maintenance point setting storage unit for storing points set according to kinds of maintenance methods, and wherein the program allows the server machine to acquire the kind of the maintenance method from the maintenance information received from the computer terminal; to retrieve points corresponding to the kind of the maintenance method based on the maintenance point setting storage unit; and to store the retrieved points in the maintenance point storage unit. Such configuration enables a computer to function as the server in order to generate points according to kinds of maintenance.

In accordance with still another aspect of the present invention in order to overcome the above drawbacks, there is provided a computer-readable recording medium storing a program for providing maintenance management point service to a customer, wherein the program runs on a computer and works with a server machine, wherein the server machine is connected with a computer terminal of a customer side through a network for bi-directional communication, the computer terminal being connected to an object apparatus serving as an object of maintenance management, and includes a lottery point storage unit for storing points generated based on a result of a lottery executed in response to the restart information and a lottery point setting storage unit for storing preset points corresponding to numbers within a specific range employed in the lottery, and wherein the program allows the server machine to generate a random number within the specific range upon reception of the restart information from the computer terminal; to retrieve points corresponding to the random number from the lottery point setting storage unit; and to store the retrieved points in the lottery point storage unit. Such configuration enables a computer to generate points according to a result of a lottery performed upon restarting the manufacturing apparatus.

In accordance with still another aspect of the present invention in order to overcome the above drawbacks, there is provided a processing method of a maintenance management point service system, including a computer terminal of a customer side, connected to an object apparatus serving as an object of maintenance management; and a server machine, for providing maintenance management service, connected with the computer terminal through a network for bi-directional communication, wherein the computer terminal collects status information from the object apparatus serving as the object of maintenance management, the status information at least including information regarding whether or not the object apparatus is powered on; and transmits the collected status information via the network in response to a request of the server machine, and the server machine includes a status point storage unit for storing points generated based on the status information; receives the status information from the computer terminal at every specific interval; determines whether or not the object apparatus serving as the object of maintenance management is powered on based on the status information; renews points of the status point storage unit by adding specific number of points in case of determining that the object apparatus is powered on; and does not renew the points of the status point storage unit in case of determining that the object apparatus is not powered on. Such configuration can promote the customer's own maintenance and reduce workload of servicemen.

In accordance with still another aspect of the present invention in order to overcome the above drawbacks, there is provided a processing method of a maintenance management point service system, including a computer terminal of a customer side, connected to an object apparatus serving as an object of maintenance management; and a server machine, for providing maintenance management service, connected with the computer terminal through a network for bi-directional communication, wherein the computer terminal transmits maintenance information including a kind of a maintenance method executed at the customer side to the server machine, and the server machine includes a maintenance point storage unit for storing points generated based on the maintenance information and a maintenance point setting storage unit for storing points set according to kinds of maintenance methods; acquires the kind of the maintenance method from the maintenance information received from the computer terminal; retrieves points corresponding to the kind of the maintenance method based on the maintenance point setting storage unit; and stores the retrieved points in the maintenance point storage unit. By such configuration, the customer tries to perform maintenance by him/herself as much as possible to collect higher points, which in turn promotes the customer's own maintenance and reduces workload of servicemen.

In accordance with still another aspect of the present invention in order to overcome the above drawbacks, there is provided a processing method of maintenance management point service system, including a computer terminal of a customer side, connected to an object apparatus serving as an object of maintenance management; and a server machine, for providing maintenance management service, connected with the computer terminal through a network for bi-directional communication, wherein the computer terminal monitors whether or not the object apparatus serving as the object of maintenance management is restarted and transmits restart information including information indicating restart completion to the server machine in case of determining that the object apparatus as the object of maintenance management is restarted, and the server machine including a lottery point storage unit for storing points generated based on a result of a lottery executed in response to the restart information and a lottery point setting storage unit for storing preset points corresponding to numbers within a specific range employed in the lottery; generates a random number within the specific range upon reception of the restart information from the computer terminal; retrieves points corresponding to the random number from the lottery point setting storage unit; and stores the retrieved points in the lottery point storage unit. By such configuration, the customer tries to win the lottery to collect points, which in turn promotes the customer's own maintenance and reduces workload of servicemen.

Further, points used herein means so-called benefits of a customer and, for example, the customer can receive service such as maintenance substantially equivalent to collected points. Furthermore, maintenance used herein means repair of the apparatus and the like. Still further, a maintenance method, i.e., a repair method, includes methods used in cases of inspecting, exchanging parts, or repairing the apparatus out of order as well.

BRIEF DESCRIPTION OF THE DRAWINGS

The above and other objects and features of the present invention will become apparent from the following description of preferred embodiments, given in conjunction with the accompanying drawings, in which:

FIG. 4 offers an example of a lottery data table in accordance with the present embodiment;

FIG. 6 presents an example of a customer information management database in accordance with the present embodiment;

FIG. 7 depicts an example of a status point information management database in accordance with the present embodiment;

FIG. 8 represents an example of status point information shown on a display unit screen of the server in accordance with the present embodiment;

FIG. 9 sets forth an example of a maintenance point information management database in accordance with the present embodiment;

FIG. 10 shows an example of a lottery point information management database in accordance with the present embodiment;

FIG. 11 illustrates an example of a cumulative point information management database in accordance with the present embodiment;

FIG. 12 describes an example of a maintenance method direction information management database in accordance with the present embodiment;

FIG. 15 presents an example of a contents menu shown on the display unit screen of a server in accordance with the present embodiment;

FIG. 17 represents an example of maintenance method description shown on the display unit screen of the server in accordance with the present embodiment;

DETAILED DESCRIPTION OF THE PREFERRED EMBODIMENTS

Figure 1:
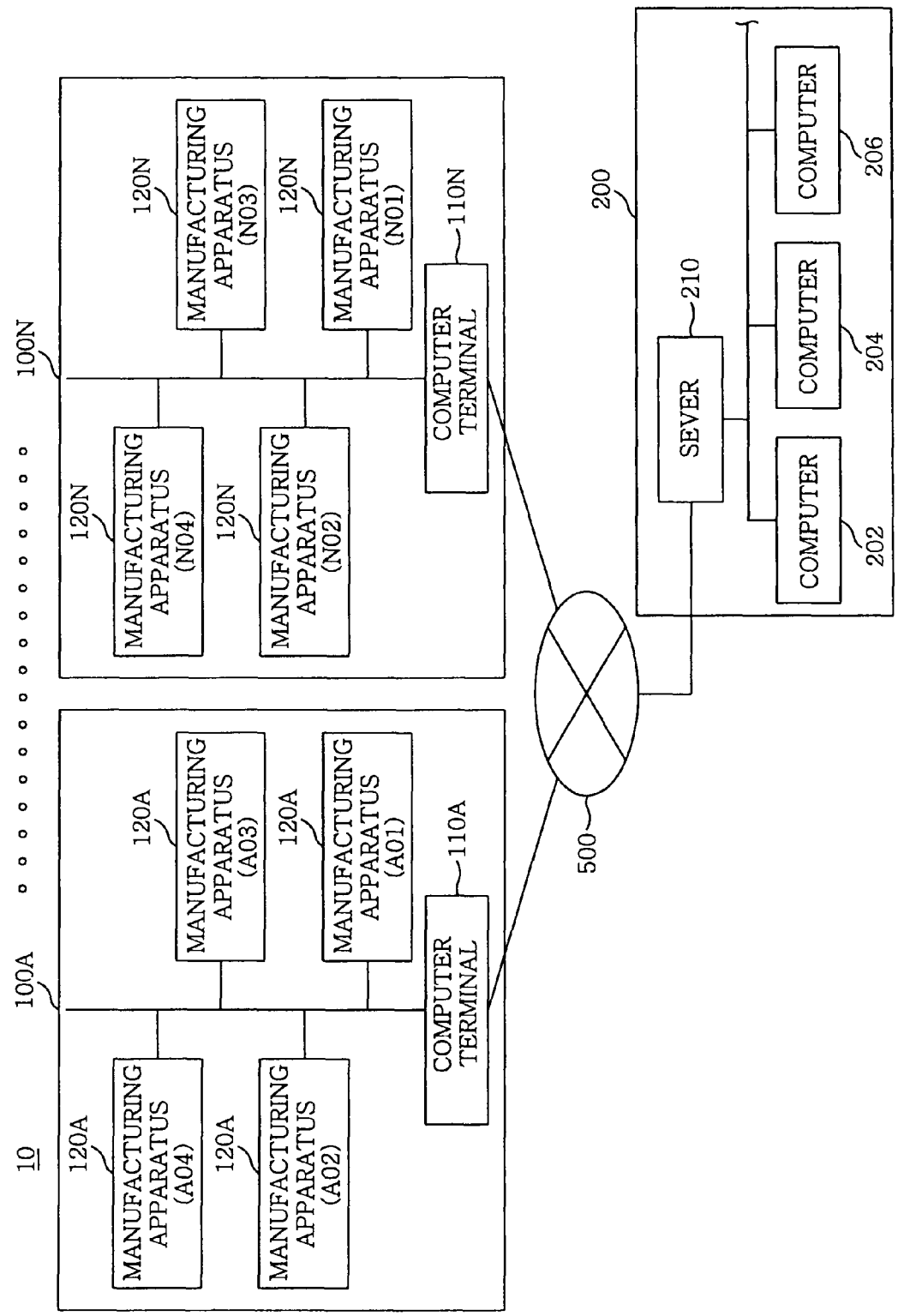
FIG. 1 is a block diagram of a maintenance management point service system in accordance with the an embodiment of the present invention.

Hereinafter, preferred embodiments of a system for providing maintenance management point service in accordance with the present invention will be described in detail with reference to accompanying drawings, in which like reference numerals designate like parts having practically the same functions throughout the specification and the drawings and repeated description thereof is omitted.

There will be described a system for providing maintenance management point service of a semiconductor manufacturing apparatus. The maintenance management point service system grants conditional benefit points to a customer to promote the customer's own maintenance as much as possible.

FIG. 1 is a block diagram of the system in accordance with the present embodiment. In the maintenance management point service system 10 in accordance with the present embodiment, factories 100A, 100B, . . . , 100N for manufacturing a semiconductor, which are in position as a customer of a manufacturing apparatus, a vendor 200 for providing maintenance management service of the manufacturing apparatus and the like are connected with one another through a network, e.g., the internet 500, enabling a bi-directional communication.

Each factory 100 of the factories 100A, 100B, . . . , 100N is provided with a computer terminal 110 as a computer terminal of the customer side; and a manufacturing apparatus 120 serving as an object of maintenance management. The computer terminal 110 is connected to each manufacturing apparatus 120 via a network such as LAN. Further, the factories 100A, 100B, . . . , 100N may include various kinds and an arbitrary number of manufacturing apparatuses 120 according to the factory, respectively. The manufacturing apparatus 120 may be an apparatus for each performing respective processes such as etching, a film-forming process, ashing and sputtering, and a so-called multi chamber type manufacturing apparatus made into a cluster apparatus, capable of performing a plurality of processes in one apparatus. Further, the computer terminal 110 may be connected to the internet 500 by a provider (not shown) and the like through, e.g., a fire wall, otherwise a server function may be added to a computer forming the computer terminal 110 to connect to the internet 500.

The vendor 200 provides maintenance management point service of the manufacturing apparatus 120 belonging to the factory 100. The vendor 200 has a server 210 as a server machine and computers 202, 204, 206, which are connected with one another by an intra-company network. The computers 202, 204, 206 may be regarded as a computer installed in a branch or an establishment of the vendor 200, respectively, and the number thereof is not limited thereto. The server 210 is connected to the network, e.g., the internet 500, enabling a bi-directional communication.

Figure 2:
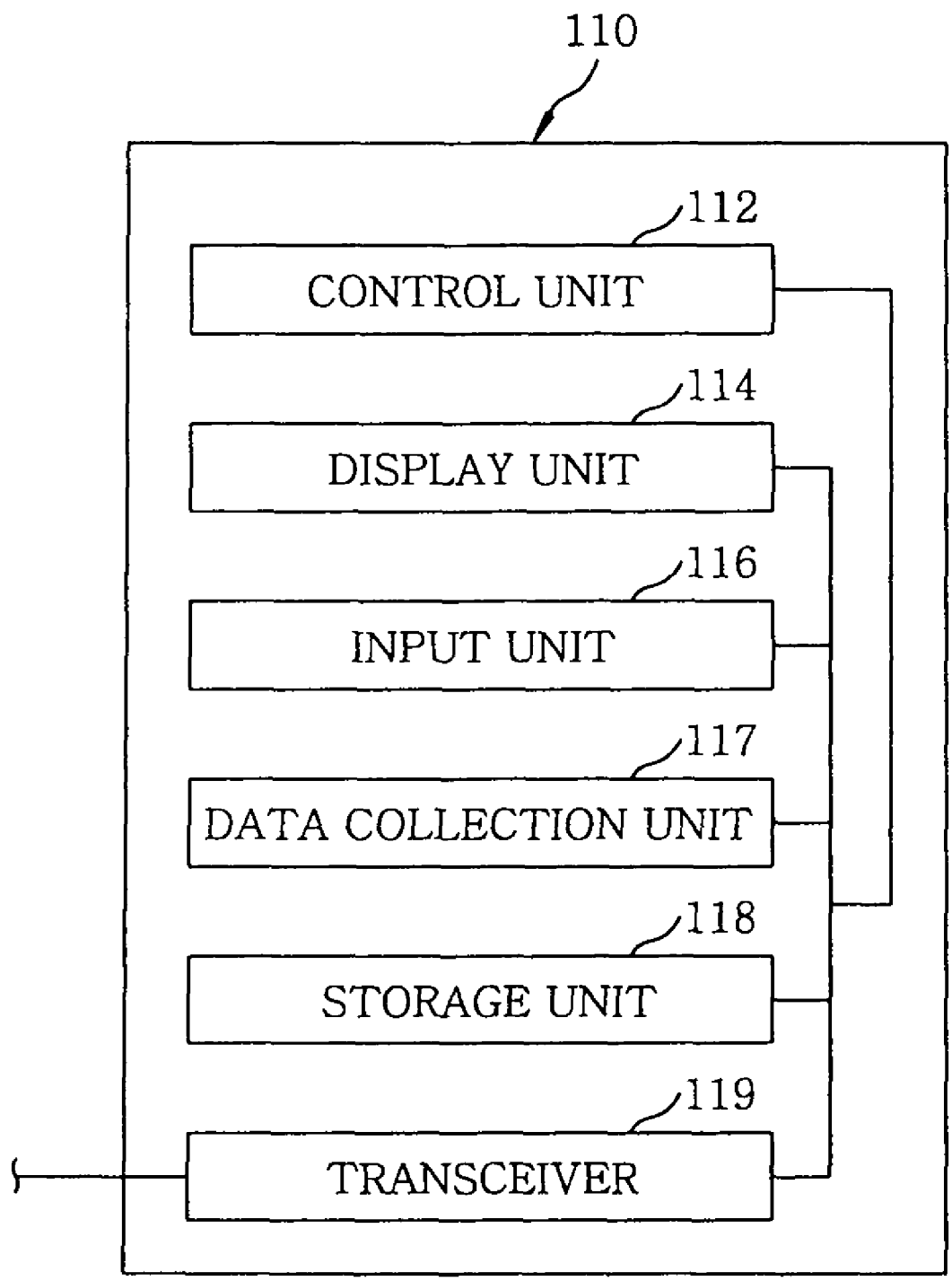
FIG. 2 shows a block diagram of a computer terminal in accordance with the present embodiment.

As shown in FIG. 2, the computer terminal 110 of the factory 100 includes a control unit 112 having CPU (a central processing unit) and memories such as ROM, RAM; a display unit 114 such as a display which displays contents or various information transmitted from the server 210; an input unit 116 for inputting various data; a data collection unit 117; a storage unit 118 for storing information, a program and the like received from the server 210; and a transceiver 119 for transmitting or receiving information (data) to or from the server 210 through the internet 500. A memory of the control unit 112 stores a program or data to be accessed by CPU and, e.g., reads a program stored in the storage unit 118 and then stores it, as required. The data collection unit 117 collects status information of the manufacturing apparatus 120 at every specified interval (e.g., every hour). The status information includes apparatus operation status information, apparatus information and the like.

Figure 3:
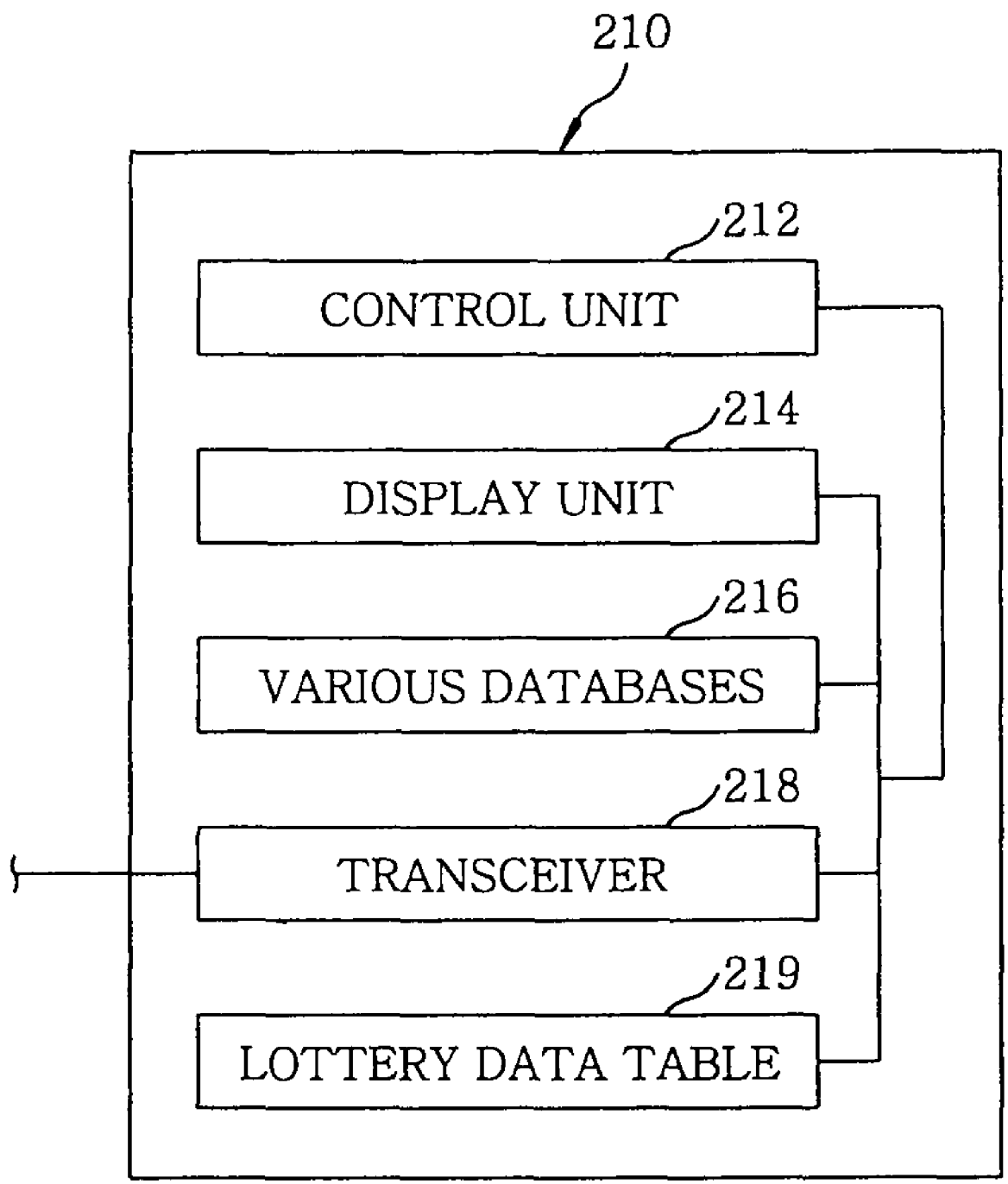
FIG. 3 describes a block diagram of a server in accordance with the present embodiment.

As shown in FIG. 3, the server 210 of the vendor 200 includes a control unit 212 having CPU (a central processing unit) and memories such as ROM, RAM; a display unit 214 such as a display; various databases 216; a transceiver 218 for transmitting or receiving information (data) to or from the server 210 through the internet 500; and a lottery data table 219. A memory of the control unit 212 stores a program or data to be accessed by CPU and, e.g., reads a program storage database of various databases 216 and then stores it, as required.

The lottery data table 219 is used in a lottery performed when the manufacturing apparatus 120 is restarted after a completion of maintenance. For example, in a case of generating a one-digit random number on restarting the manufacturing apparatus 120, as shown in FIG. 4, previously stored are winners or losers corresponding to 0 to 9; zero lottery point for losers; and an adequate lottery point value for winners. The lottery data table 219 is prepared by using a storage unit such as a rewritable memory in order to write the table again afterwards.

Figure 5:
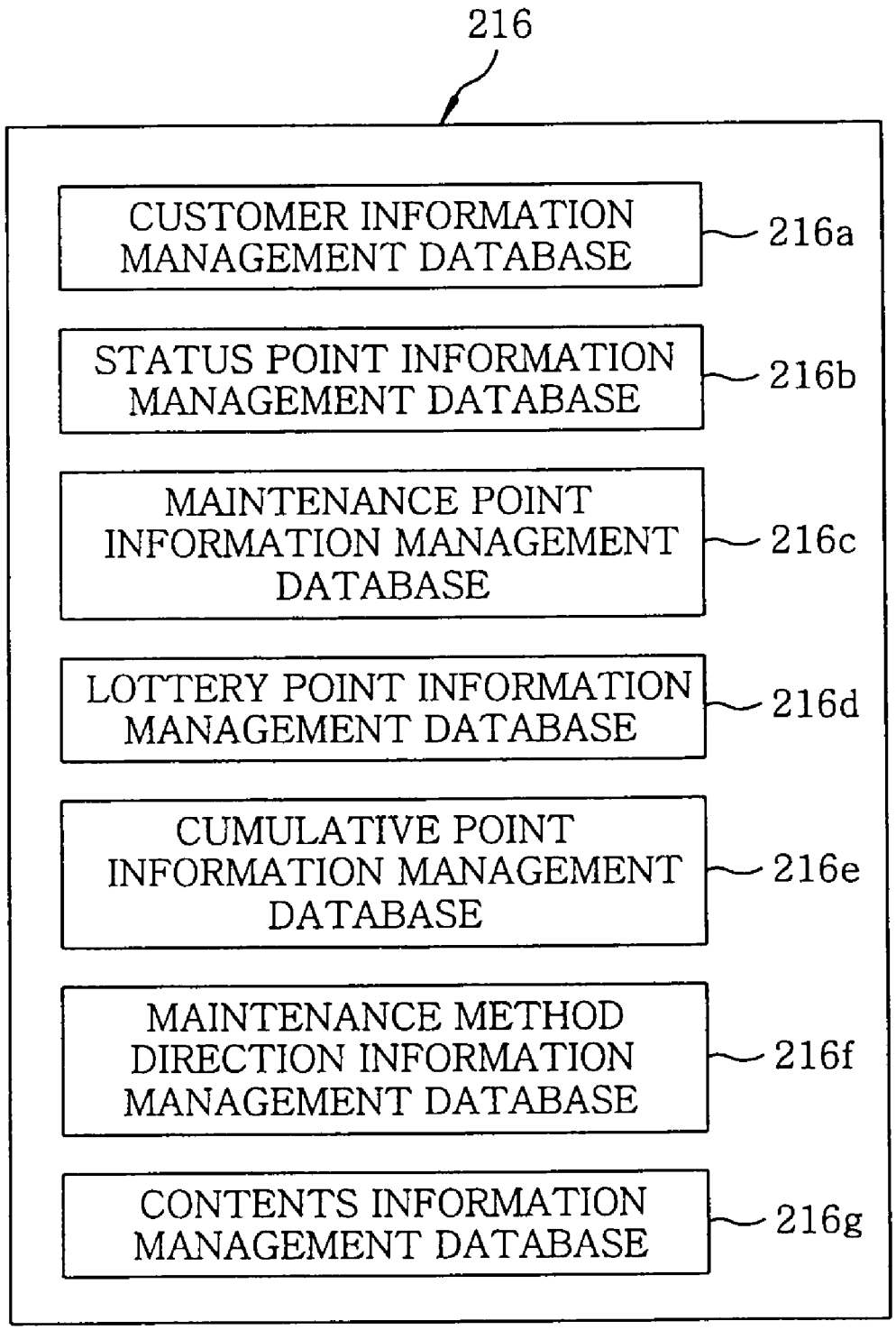
FIG. 5 provides a configuration of various databases in accordance with the present embodiment.

As shown in FIG. 5, the various databases 216 includes a customer information management database 216a; a status point information management database (a status point storage unit) 216b; a maintenance point information management database (a maintenance point storage unit, a maintenance point setting storage unit) 216c; a lottery point information management database (a lottery point storage unit, a lottery point setting storage unit) 216d; a cumulative point information management database 216*e*; a maintenance method direction information management database 216*f*; and a contents information management database 216*g*.

Stored in the customer information management database 216*a* are, as shown in FIG. 6, for example, a customer name such as a company name (possibly including a factory name), ID, a password and an address of the customer and the customer's apparatus information. The apparatus in possession is the manufacturing apparatus 120 or the like serving as an object of maintenance and stored by, e.g., a serial number thereof.

The status point information management database 216*b* is used to manage point information generated based on status information such as operation status information of the manufacturing apparatus 120. Stored in the status point information management database 216*b* are, for example, as shown in FIG. 7, a customer name, ID, an apparatus belonging to the customer, status information of the apparatus, points, on-call information (information on demand for maintenance), and remarks. The apparatus in possession is the manufacturing apparatus 120 or the like serving as an object of maintenance, and stored by, e.g., a serial number thereof.

Further, as the operation status information in the status information, for example, "in order (OK)" indicates a status wherein the apparatus operates without a malfunction and "out of order (NG)" indicates a status wherein the apparatus is stopped due to a malfunction. Furthermore, "idle status" indicates a status wherein the apparatus is stopped even without a malfunction. In cases of "in order (OK)", "out of order (NG)" and "idle status", the manufacturing apparatus 120 makes a response (an acknowledge) to an inquiry about status information and is powered on. However, when the manufacturing apparatus 120 is not powered on and thus makes no response to the inquiry about status information, "no response" may be indicated. The server 210 inquires status information by connecting to the computer terminal 110 through the internet 500 at every specified interval (e.g., every hour). That is, a status information request (corresponding to a maintenance information transmission request) is transmitted to the computer terminal 110. The computer terminal 110 receives the status information request and then transmits status information of each manufacturing apparatus 120 to the server 210 in response.

Additionally, the on-call information is an information regarding whether or not the customer requests maintenance from a service station of a vendor side providing maintenance service via a telephone, FAX, mail, a home page and the like. For example, when a maintenance request does not exist, the information of on-call "NO" is stored, and when a maintenance request exists, on-call "YES" is stored.

Moreover, when the manufacturing apparatus 120 belonging to the customer is powered on continuously as in normal operation, a present point value increasing by predetermined number of points (e.g., 1 point) is stored in the status point at every specified interval (e.g., every hour).

Further, the status point information stored in the status point information management database 216*b* can be represented on the display unit 214 as shown in FIG. 8. In such case, a blue circle, a yellow circle or a red circle may be indicated in the status information according to the content of a status. For example, "in order (OK)" may be indicated as a blue circle; "idle status", a yellow circle; and "out of order (NG)", a red circle. Furthermore, error message may be given in the remarks. Consequently, for example, when the customer transmits the following maintenance completion information after maintenance, reliability thereof can be guaranteed, which in turn prevents errors.

The maintenance point information management database 216*c* is used to manage point information generated based on maintenance information (repair information), wherein the maintenance is performed by the customer him/herself. Stored in the maintenance point information management database 216*c* are, as shown in FIG. 9, for example, a customer name, ID, a maintenanced apparatus, a kind of maintenance method and maintenance points. The maintenanced apparatus is an apparatus maintenanced by the customer him/herself, which is stored by a serial number thereof, and the kind of maintenance method (a kind of maintenance information) is a kind of maintenance method performed by the customer him/herself. Preset points are stored in the maintenance points according to the kind of maintenance method performed by the customer him/herself. Kinds of maintenance methods and maintenance points corresponding to each thereof are stored in the maintenance method direction information management database 216*f* in advance.

The lottery point information management database 216*d* is used to manage point information generated in a lottery performed when restarting the manufacturing apparatus 120. Stored in the lottery point information management database 216*d* are, as shown in FIG. 10, for example, a customer name, ID, a restarted apparatus, lottery points, restart day. The restarted apparatus is an apparatus maintenanced and restarted by the customer him/herself, which is stored by a serial number thereof. The lottery points are points generated according to the result of a lottery performed upon restart. For example, when the lottery results in a loser, a zero point is assigned as the lottery point and when the lottery results in a winner, the lottery points become the point value.

The cumulative point information management database 216*e* is used to manage cumulative point information in which all the points are summed up for each customer. Data may be recorded in the cumulative point information at every specified interval, e.g., every month. Stored in the cumulative point information management database 216*e* are, as shown in FIG. 11, for example, a customer name, ID, month and cumulative points. The above-mentioned status points, maintenance points, lottery points and sum are stored as the cumulative points. The sum is a sum of status points, maintenance points and lottery points for the month.

The maintenance method direction information management database 216*f* is used to manage maintenance method direction information such as a procedure for the customer's own maintenance. The maintenance method direction information is maintenance instructions for the customer. Stored in the maintenance method direction information management database 216*f* are, as shown in FIG. 12, for example, a kind of maintenance method, time required for maintenance, maintenance points and description of the maintenance method.

The above-described kinds of maintenance methods are itemized and divided into large items, medium items and small items. The widest concepts, e.g., a chamber and a transfer system are stored under the large items. An upper electrode and a lower electrode of the chamber and a transfer arm, an atmosphere side arm and an indexer of the transfer system are stored in the medium items. Stored in the small items are specific kinds of maintenance methods, e.g., an exchanging method, a cleaning method and an examining method with naked eye in case of the upper electrode of the chamber; and an adjusting method and a cleaning method in case of the transfer arm of the transfer system.

Further, the time required in maintenance is time required in performing particular maintenance. For example, in case of the upper electrode of the chamber, the required time may be two hours for the exchanging method; one hour for the cleaning method; and thirty minutes for the examining method with naked eye. Further, in case of the transfer arm of the transfer system, the required time may be two and a half hours for the adjusting method; and one hour for the cleaning method.

In addition, the maintenance points is points given when the customer performs maintenance by him/herself, which are set in terms of the level of relative difficulty of maintenance. For example, traditionally, taking into account that the higher the level of difficulty, the longer time it takes to perform maintenance, and thus the maintenance points are set according to the amount of time required in performing such task. In such case, large number of maintenance points may be set for time consuming maintenance. For example, some points are set for one hour required in maintenance. For example, provided 100 points are set per hour, in case of the upper electrode of the chamber, the maintenance points may be 200 points for two hours spent in performing the exchanging method; 100 points for one hour spent in executing the cleaning method; and 50 points for thirty minutes spent in executing the examining method with naked eye. Further, in case of the transfer arm of the transfer system, the maintenance point may be 250 points for two and a half hours spent in executing the adjusting method; and 100 points for one hour spent in executing the cleaning method. Moreover, the customer can use acquired points to receive maintenance service corresponding to the maintenance points as set above.

Stored in the contents information management database 216g are contents such as HTML files, graphical icon files such as GIF files, and hypertext objects, e.g., voice and image objects, which are provided by the server 210. Such objects are provided to each computer terminal 110 through, e.g., the internet 500, and are for example, displayed on the display unit 114 of the computer terminal 110.

Next, an operational flow of an optimum service selection support system in accordance with the present embodiment will be described with reference to FIGS. 13 to 19. Further, typically, the system may be operated by a program recorded in a recording medium such as a hard disk device.

Figure 13:
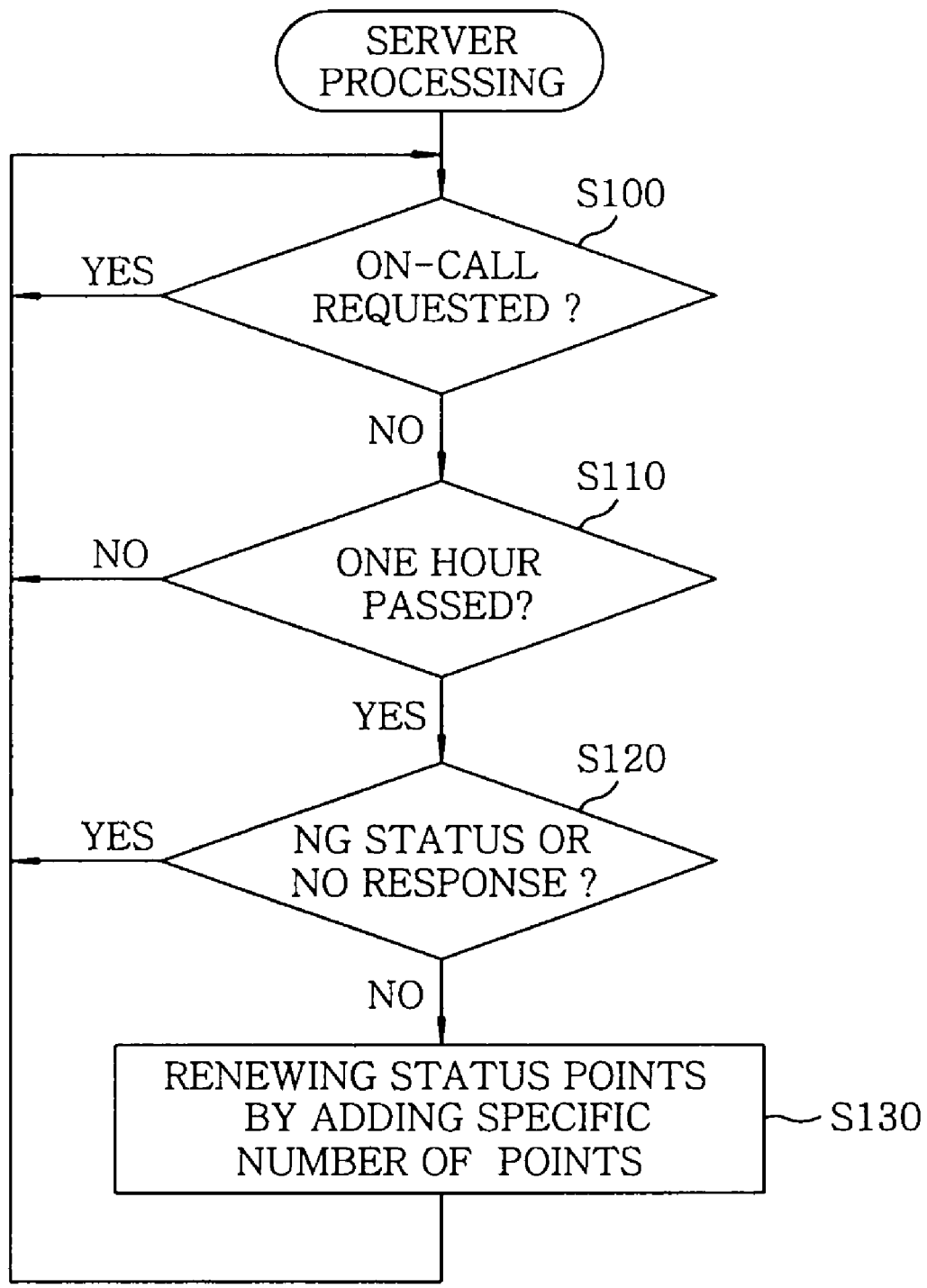
FIG. 13 offers an operational flow of a processing of the server for generating status points in accordance with the present embodiment.

FIG. 13 shows an operational flow in case of granting status points. The status points are predetermined number of points (e.g., one point) given at every specified interval (e.g., every hour) when the manufacturing apparatus 120 belonging to the customer is continuously powered on. However, in case of the on-call, out of order (NG) status information or if there is no response, no point is added until the status is restored. Further, the operational flow is performed for an apparatus belonging to each customer.

Specifically, as shown in FIG. 13, at step S100, the server 210 determines whether on-call information exists or not based on the on-call information of the status point information management database 216b. If no on-call is determined, at step S110, it is determined whether one hour has passed. For example, time may be estimated by using a clock function of a computer included in the server 210.

If, at step S110, one hour passage is determined, it is determined whether the status information has no response or is out of order (NG) based on the status information of the status point information management database 216b at step S120. If it is determined the status information does not have no response or is not out of order (NG), the status points are renewed at step 5130. Specifically, predetermined points (e.g., one point) are added to the status points stored in the status point information of the status point information management database 216b to create new status points.

In both cases of determining that on-call exists at step 100; and the status information is out of order (NG) at step 120, processing returns to step S100. Thus, in such cases, the status points of the status point information management database 216b are not renewed.

As described above, points are added and accumulated at every specified interval when the manufacturing apparatus 120 serving as an object of maintenance management is powered on, that is, in principle, when the manufacturing apparatus 120 makes a certain response (an acknowledge) to an inquiry (a request) from the computer terminal, except when the status information is out of order (NG), e.g., the manufacturing apparatus 120 of the customer is in state of malfunction or there is a request (on-call) for maintenance regardless of malfunction. Consequently, the customer performs maintenance by him/herself as much as possible without on-call in order to collect points, whereby the customer can be encouraged to perform maintenance by him/herself and thus workload of servicemen can be reduced.

Additionally, without exceptions, it is possible that when the manufacturing apparatus 120 is powered on, for example, when the manufacturing apparatus 120 makes a certain response (an acknowledge), as the status information is in order (OK), out of order (NG), or idle status, to an inquiry (a request) from the computer terminal 110, the status points may be added at every specified interval; and when there is no response, the status points are not added. Consequently, for example, when the manufacturing apparatus 120 is continuously powered on, benefit points are accumulated and thus the customer tries to perform maintenance by him/herself to collect points, which in turn reduces workload of the servicemen.

Figure 14:
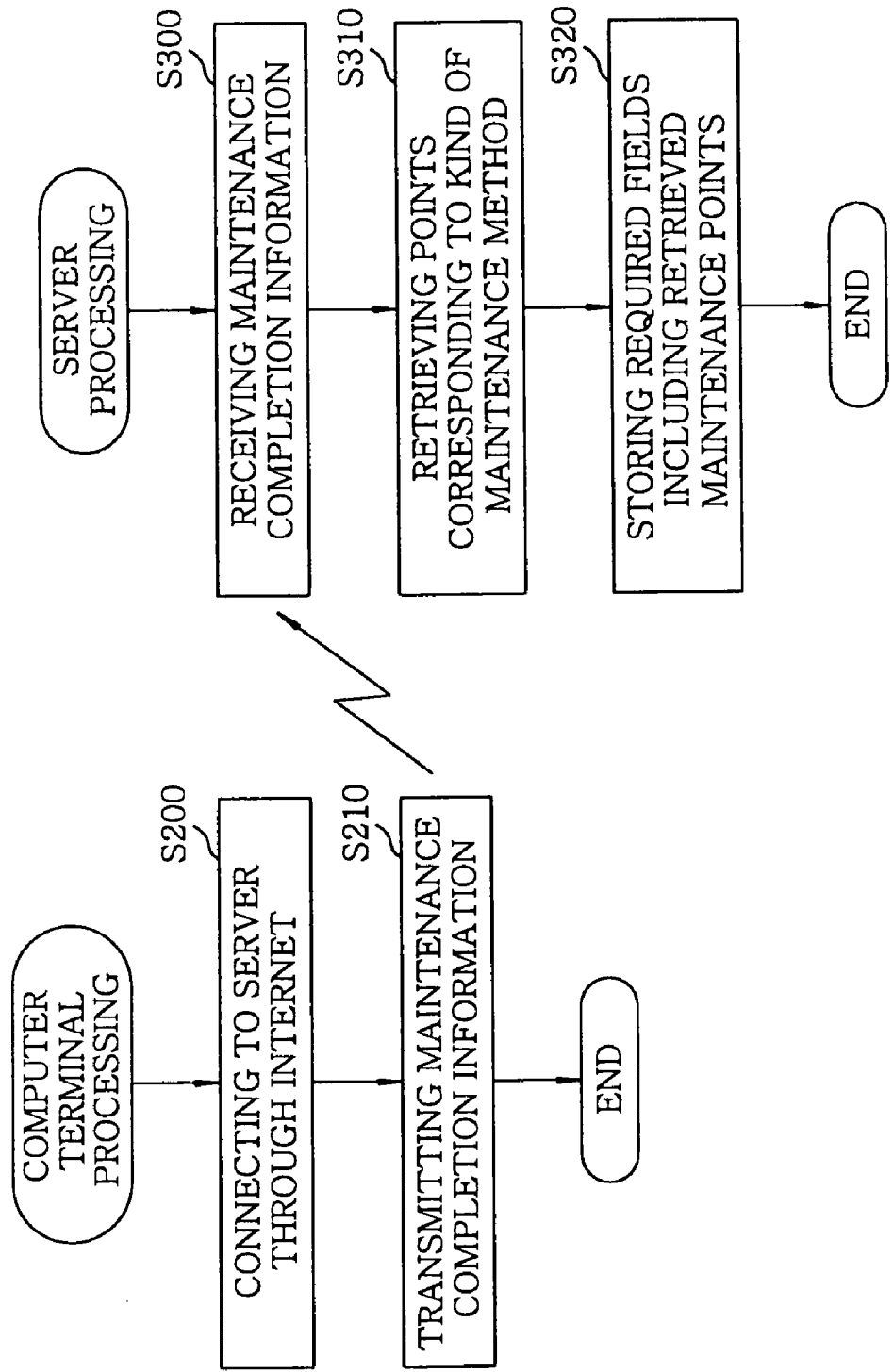
FIG. 14 provides an operational flow of a processing of the computer terminal and the server for generating maintenance points in accordance with the present embodiment.

FIG. 14 shows an operational flow in case of giving the maintenance points. The maintenance points according to kinds of maintenance methods are added when the customer performs maintenance by him/herself.

Specifically, as shown in FIG. 14, at step S200, the computer terminal 110 is connected to the server 210, e.g., through the internet 500. For example, a site provided by the server 210 of the vendor 200 in accordance with the present embodiment may be accessed through sites on the net other than a provider contents page. Then, for example, a menu screen depicted in FIG. 15 is displayed on the display unit 214 of the computer terminal 110, which includes maintenance method description. On the menu screen are, e.g., semiconductor manufacturing apparatus description, provided service description, and maintenance method description.

Figure 16:
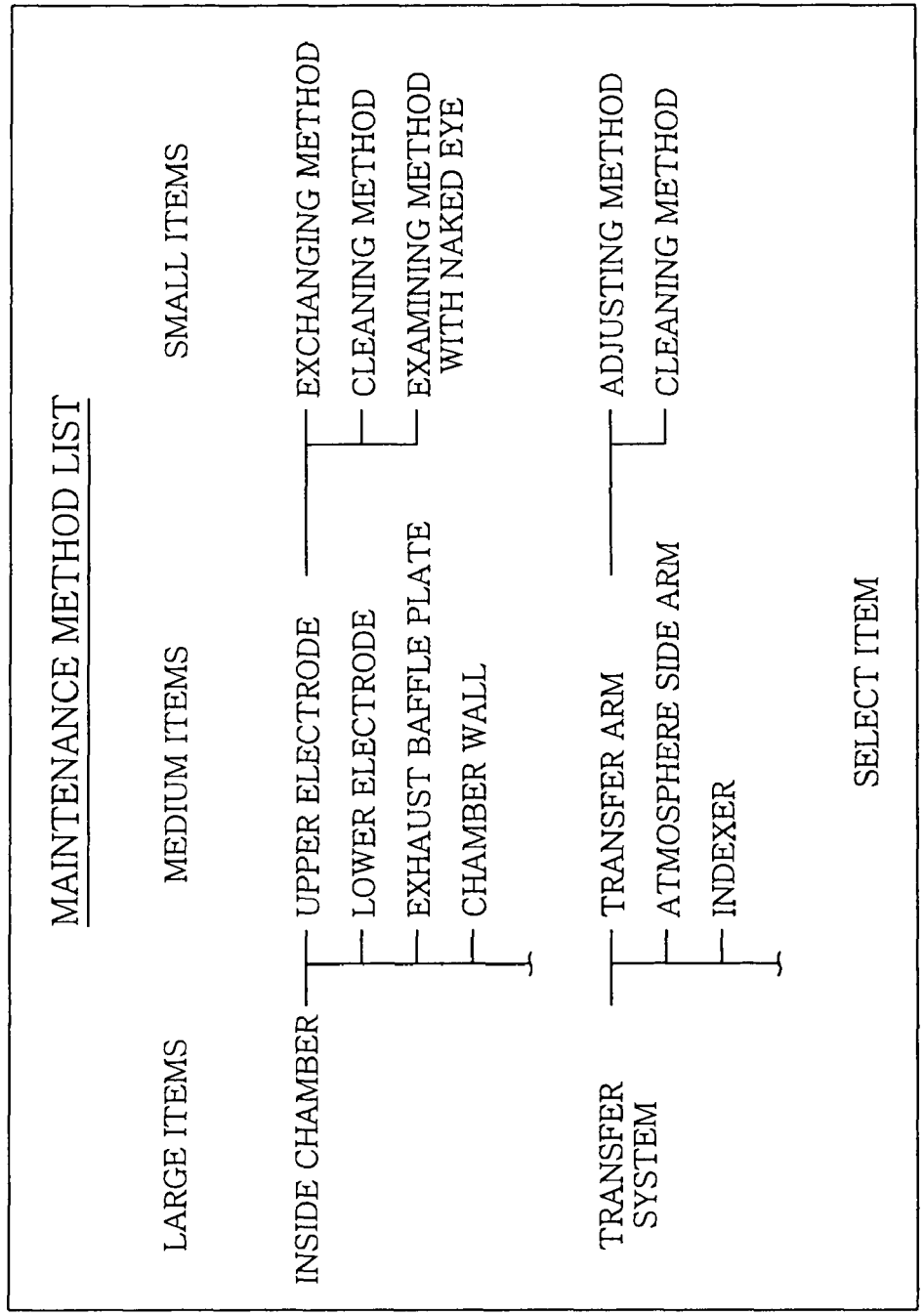
FIG. 16 depicts an example of a maintenance method list shown on the display unit screen of the server in accordance with the present embodiment.

When the maintenance method description is selected on the menu screen, a maintenance method list screen is represented as shown in FIG. 16. Large items, medium items and small items of kinds of maintenance methods are shown on the above screen in a branch shape. Then, when the large item having medium items as subordinate items thereof is clicked with, e.g., a point device, the medium item contents are represented. When the medium item having the small items as subordinate items thereof is clicked, the small item contents are shown. Further, when the large item or the medium item without subordinate items, or the small item is clicked, a maintenance method description screen is displayed as shown in FIG. 17. Time required in maintenance and maintenance points are also represented on the screen. Consequently, the customer can acquire the maintenance method description and perform maintenance by him/herself. Then, the maintenance points for maintenance are displayed as well and thus the customer can be aware of points to be gained in performing maintenance.

Further, as shown in FIG. 17, a blank field for inputting serial number of maintenanced apparatus and a maintenance completion button are represented on the screen of maintenance method description. The maintenance completion button is used to transmit maintenance completion information to the server 210 when the customer's own maintenance is completed. That is, if the maintenanced apparatus is inputted by a serial number and the maintenance completion button is pressed (e.g., clicking with the point device), at step S210, the computer terminal 110 transmits the maintenance completion information including the maintenanced apparatus and the kind of maintenance method to the server 210.

Subsequently, if, at step S300, the server 210 receives the maintenance completion information, it retrieves points corresponding to the kind of maintenance method from the maintenance method direction information management database 216f at step S310. Then, at step S320, the server 210 stores a maintenanced apparatus, a kind of maintenance method, maintenance points, and maintenance day in the maintenance point information management database 216f.

As described above, points are generated according to a kind of maintenance performed by the customer him/herself. Consequently, the customer performs maintenance by him/herself as much as possible to collect points, whereby the customer's own maintenance can be promoted and thus workload of servicemen can be reduced.

In particular, when higher points are set for more time consuming maintenance, the customer will try to perform difficult maintenance taking longer amount time to collect more points, whereby the customer's own maintenance can be promoted despite high level of difficulty in maintenance and thus workload of the servicemen can be further reduced.

Figure 18:
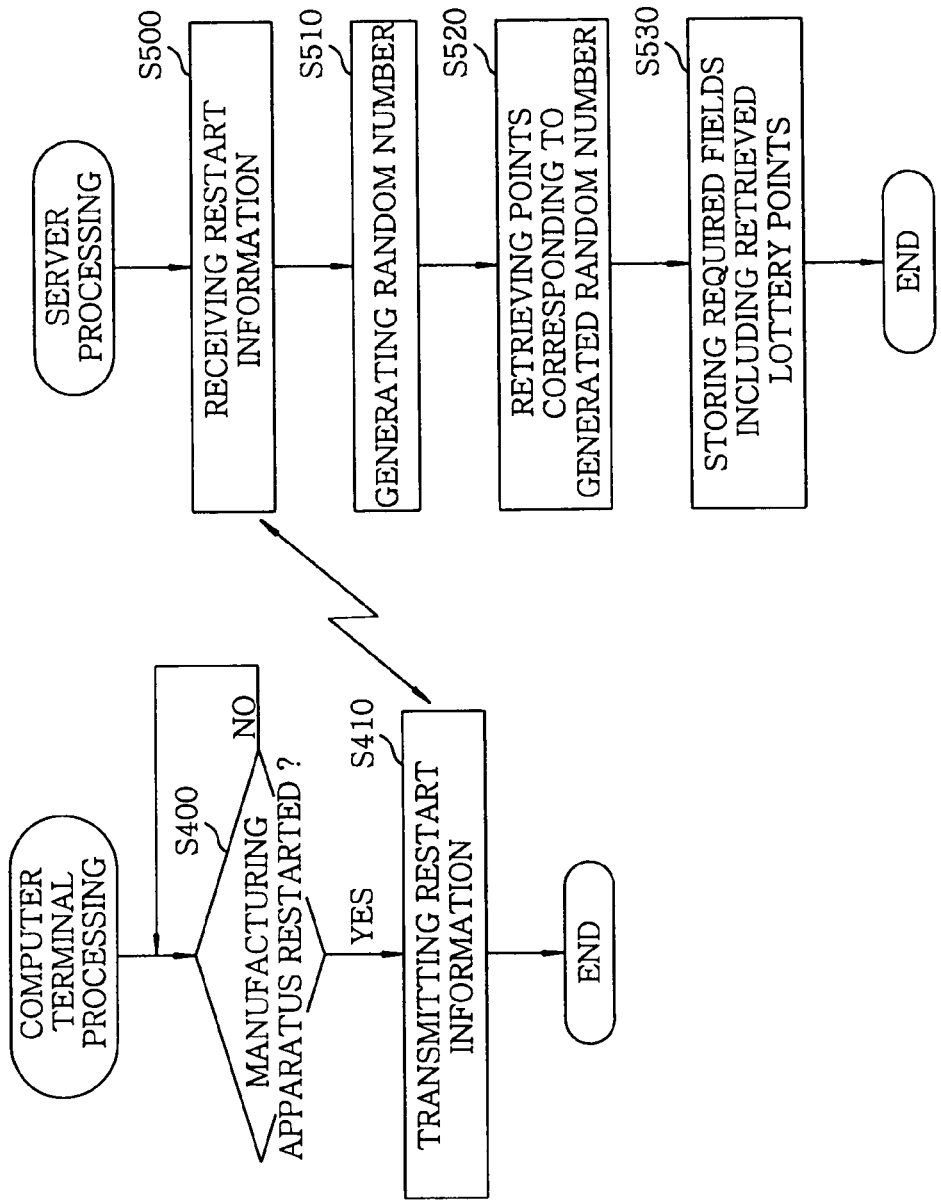
FIG. 18 sets forth an operational flow of a processing of the computer terminal and the server for generating lottery points in accordance with the present embodiment.

FIG. 18 shows an operational flow in a case of giving the lottery points. When restarting the manufacturing apparatus 120 after maintenance, a lottery is performed and the lottery points are assigned for a winner.

Specifically, as shown in FIG. 18, at step S400, the computer terminal 110 determines whether the manufacturing apparatus 120 is restarted. That is, in order to perform a lottery upon restart of the manufacturing apparatus 120 after the customer's own maintenance, it is checked whether the manufacturing apparatus 120 is restarted or not. After determining the restart, transmitted to the server 210 are restart information including restart completion, a serial number of the manufacturing apparatus 120 and the like through the internet 500 at step S410. Thereafter, if, at step S500, the server 210 receives the restart information from the computer terminal 110, it generates a random number, e.g., a one-digit random number, at step S510. Subsequently, at step S520, the server 210 retrieves lottery points corresponding to the generated random number from the lottery data table 219 and then, at step S530, stores required information such as retrieved lottery points, a serial number of the restarted manufacturing apparatus, and restart day in the lottery point information management database 216d.

As described above, setting zero point for a lottery loser and predetermined points for lottery winners in advance, the manufacturing apparatus 120 is restarted after the customer performs maintenance thereof and then a lottery is performed such that when picking a winner predetermined number of points are gained. Consequently, the customer tries to win the lottery to collect points, which in turn promotes the customer's own maintenance and reduces workload of the servicemen.

Figure 19:
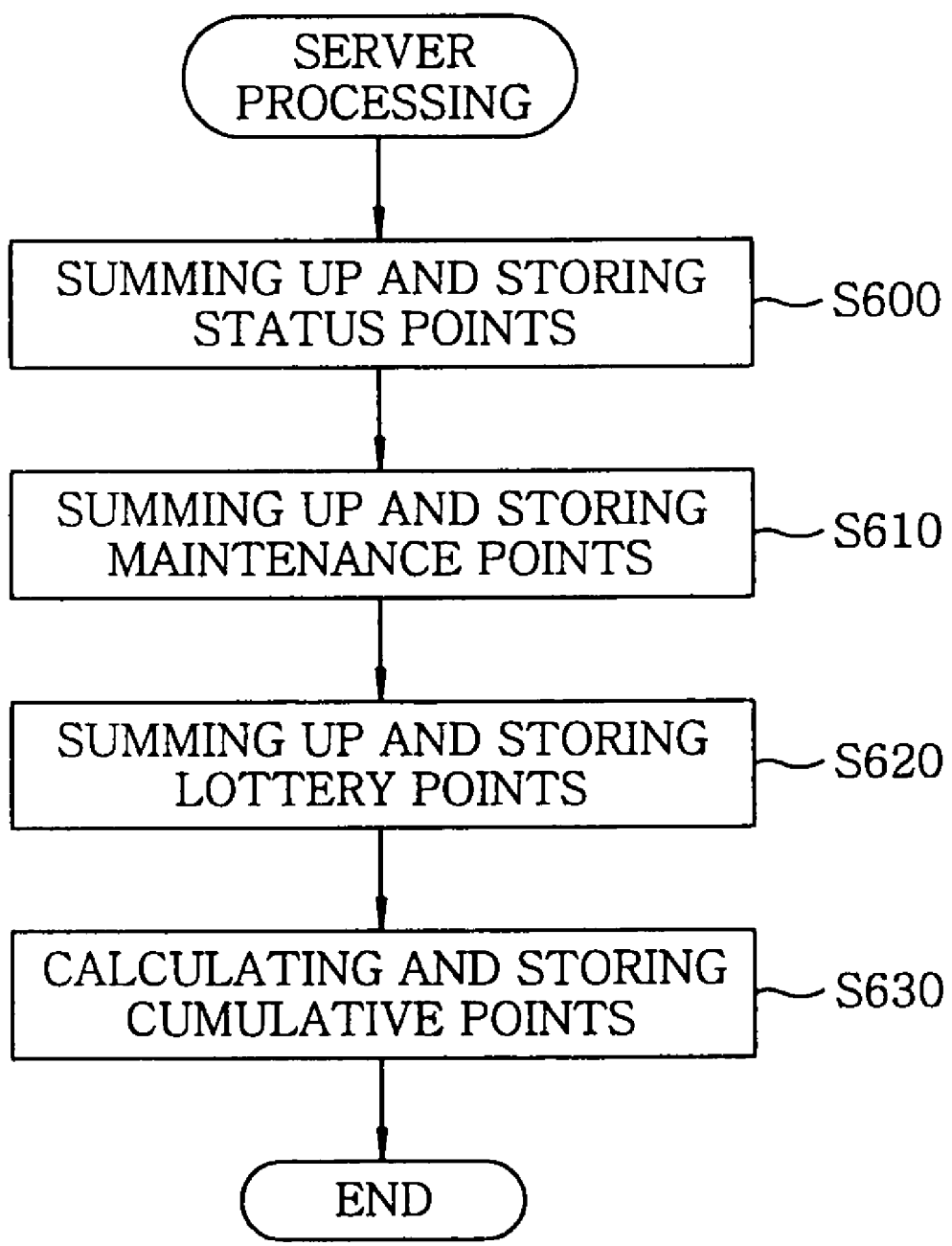
FIG. 19 shows an operational flow of a processing executed by the server for calculating cumulative points in accordance with the present embodiment.

FIG. 19 shows an operational flow for calculating the cumulative points. Such processing is performed for each customer. Further, the processing may be performed as required or at every regular interval, e.g., every month.

Specifically, as shown in FIG. 19, the server 210 sums up the status points and then stores the result thereof at step S600. That is, the server 210 sums up the status points of each manufacturing apparatus of the status point information management database 216b shown in FIG. 7, and stores a sum value thereof in a status point blank field of the cumulative point information management database 216e shown in FIG. 11.

Subsequently, at step S610, the server 210 figures out and stores a sum of the maintenance points. That is, the server 210 sums the maintenance points of the maintenance point information management database 216c shown in FIG. 9, and stores a sum value thereof in a maintenance point blank field of the cumulative point information management database 216e shown in FIG. 11.

Continuously, at step S620, the server 210 figures out and stores a sum of the lottery points. That is, the server 210 sums the lottery points of the lottery point information management database 216d shown in FIG. 10, stores a sum value thereof in a lottery point blank of the cumulative point information management database 216e shown in FIG. 11.

Next, at step S630, the server 210 calculates a sum of the cumulative points. That is, the server 210 sums points of respective blanks of the status points, the maintenance points and the lottery points of the cumulative point information management database 216e, and stores a sum value thereof in a sum blank of the cumulative points. Thus, points stored in the sum blank of the cumulative points are previous points of the customer at a point of performing the processing.

Therefore, in cases that a manufacturing apparatus serving as an object of maintenance is possible to be continuously operated in principle; a customer performs maintenance by him/herself; a customer won in the lottery generated upon restarting a manufacturing apparatus; and the like, points serving as benefits for a customer are given to the customer, whereby the customer can be encouraged to perform maintenance by him/herself and workload of the servicemen can be reduced. Resultantly, fewer servicemen can take charge of a larger number of manufacturing apparatuses, which in turn promotes efficiency of maintenance service.

While the invention has been shown and described with respect to the preferred embodiments with reference to the accompanying drawings, the present invention is not limited thereto. It will be understood by those skilled in the art that various changes and modifications may be made without departing from the spirit and scope of the invention as defined in the following claims.

For example, the customer information management database 216a, the status point information management database 216b, the maintenance point information management database 216c, the lottery point information management database 216d, the cumulative point information management database 216e, and the maintenance method direction information management database 216f included in various databases 216 are provided in the server 210 corresponding to a server machine in the present embodiment, but may be provided independently of the server corresponding to a server machine and connected via a server machine and an intra-company network, or a network such as the internet.

Further, for example, it is possible that "point ranking list display" is added to the contents menu shown in FIG. 15; and if selecting it, the server 210 arranges the cumulative points stored in the cumulative points information management database 216e on a home page in reverse order for each customer and makes a ranking list of cumulative points for customers, which is represented on the display unit 114 of the computer terminal 110.

As described above, in accordance with the present invention, a customer can be encouraged to perform maintenance by him/herself and workload of servicemen can be reduced by storing benefit points of the customer, which are generated based on, e.g., status information of an apparatus serving as an object of maintenance, information of a kind of maintenance method executed by a customer and a lottery executed upon restarting the apparatus after the customer's own maintenance. Resultantly, fewer servicemen can take charge of a larger number of manufacturing apparatuses, which in turn promotes efficiency of maintenance service.

While the invention has been shown and described with respect to the preferred embodiments, it will be understood by those skilled in the art that various changes and modifications may be without departing from the spirit and scope of the invention as defined in the following claims.

What is claimed is:

1. A maintenance management point service system for encouraging customers of an apparatus maintenance management service to perform apparatus maintenance without using a service person from the apparatus maintenance management service, comprising:

a computer terminal of a customer side, connected to an object apparatus serving as an object of maintenance management, the computer terminal including a display unit for displaying maintenance method description; and a server machine for providing maintenance management service for the object apparatus and connected with the computer terminal through a network for bi-directional communication, wherein the computer terminal transmits maintenance information including a kind of a maintenance method executed at the customer side to the server machine, wherein the server machine includes a maintenance point storage unit for storing points generated based on the maintenance information and a maintenance point setting storage unit for storing points set according to different kinds of maintenance methods, wherein the server machine acquires the kind of the maintenance method from the maintenance information received from the computer terminal, wherein the server machine retrieves points corresponding to the kind of the maintenance method based on the maintenance point setting storage unit, wherein the server machine stores the retrieved points in the maintenance point storage unit, and wherein the maintenance point setting storage unit sets more points for more time consuming maintenance, whereby a customer is encouraged to perform more time consuming maintenance on the object apparatus in order to obtain more points.

2. The system of claim 1, wherein the object apparatus serving as the object of maintenance management is a semiconductor manufacturing apparatus.

3. The system of claim 1, wherein the customer is allowed to receive the apparatus maintenance management service substantially equivalent to the points stored in the maintenance point storage unit.

4. A server machine, for providing maintenance management service for encouraging customers of an apparatus maintenance management service to perform apparatus maintenance without using a service person from the apparatus maintenance management service, the server machine being connected with a computer terminal of a customer side through a network for bi-directional communication, the computer terminal being connected to an object apparatus serving as an object of maintenance management and including a display unit for displaying maintenance method description, the server machine comprising:

a processor;
   a memory;
   a maintenance point storage unit for storing points generated based on maintenance information including a kind of a maintenance method executed at the customer side; and
   a maintenance point setting storage unit for storing points set according to kinds of maintenance methods, wherein the server machine acquires the kind of the maintenance method from the maintenance information received from the computer terminal, wherein the server machine retrieves points corresponding to the kind of the maintenance method based on the maintenance point setting storage unit, wherein the server machine stores the retrieved points in the maintenance point storage unit, and wherein the maintenance point setting storage unit sets more points for more time consuming maintenance, whereby a customer is encouraged to perform more time consuming maintenance on the object apparatus in order to obtain more points.

5. The server machine of claim 4, wherein the object serving as the object of maintenance management is a semiconductor manufacturing apparatus.

6. The server machine of claim 4, wherein the customer is allowed to receive the apparatus maintenance management service substantially equivalent to the points stored in the maintenance point storage unit.

7. A non-transitory computer readable storage medium comprising instructions for providing maintenance management point service to a customer and for encouraging customers of an apparatus maintenance management service to perform apparatus maintenance without using a service person from the apparatus maintenance management service, the instructions causing one or more processors of a server machine to perform the following:

connect with a computer terminal of a customer side through a network for bi-directional communication, the computer terminal being connected to an object apparatus serving as an object of maintenance management;

display maintenance method description by a display unit; store points set in a maintenance point storage unit, the points generated based on the maintenance information including a kind of a maintenance method executed at the customer side; store points set in a maintenance point setting storage unit according to different kinds of maintenance methods;

acquire the kind of the maintenance method from the maintenance information received from the computer terminal;

retrieve points corresponding to the kind of the maintenance method based on the maintenance point setting storage unit;

store the retrieved points in the maintenance point storage unit, and set the maintenance point setting storage unit more points for more time consuming maintenance, whereby a customer is encouraged to perform more time consuming maintenance on the object apparatus in order to obtain more points.

8. The non-transitory computer readable storage medium of claim 7, wherein the object apparatus serving as the object of maintenance management is a semiconductor manufacturing apparatus.

9. The non-transitory computer readable storage medium of claim 7, wherein the customer is allowed to receive the apparatus maintenance management service substantially equivalent to the points stored in the maintenance point storage unit.

10. A processing method of a maintenance management point service system for encouraging customers of an apparatus maintenance management service to perform apparatus maintenance without using a service person from the apparatus maintenance management service, the system comprising a computer terminal of a customer side, connected to an object apparatus serving as an object of maintenance management and including a display unit for displaying maintenance method description; and a server machine, for providing maintenance management service, connected with the computer terminal through a network for bi-directional communication, the processing method comprising:

the server machine receiving maintenance information transmitted from the computer terminal, the maintenance information including a kind of a maintenance method executed at the customer side to the server machine;

the server machine storing points in a maintenance point storage unit, the points generated based on the maintenance information;

the server machine storing points set in a maintenance point setting storage unit, the points set according to different kinds of maintenance methods;

the server machine acquiring the kind of the maintenance method from the maintenance information received from the computer terminal;

the server machine retrieving points corresponding to the kind of the maintenance method based on the maintenance point setting storage unit; and the server machine storing the retrieved points in the maintenance point storage unit, wherein the maintenance point setting storage unit sets more points for more time consuming maintenance, whereby a customer is encouraged to perform more time consuming maintenance on the object apparatus in order to obtain more points.

11. The processing method of claim 10, wherein the object apparatus serving as the object of maintenance management is a semiconductor apparatus.

12. The processing method of claim 10, wherein the customer is allowed to receive the apparatus maintenance management service substantially equivalent to the points stored in the maintenance point storage unit.

* * * * *

UNITED STATES PATENT AND TRADEMARK OFFICE
CERTIFICATE OF CORRECTION

| | | |
|---|---|---|
| PATENT NO. | : 7,975,049 B2 | Page 1 of 1 |
| APPLICATION NO. | : 12/708193 | |
| DATED | : July 5, 2011 | |
| INVENTOR(S) | : Hiroshi Nishikawa et al. | |

It is certified that error appears in the above-identified patent and that said Letters Patent is hereby corrected as shown below:

Column 13, line 62, change "at step 5130" to --at step S130--;

Column 15, line 5, change "at step 5210" to --at step S210--; and

Column 16, line 13, change "at step 5620" to --at step S620--.

Signed and Sealed this
Eleventh Day of October, 2011

David J. Kappos
*Director of the United States Patent and Trademark Office*